United States Patent [19]

Harwood, Jr.

[11] Patent Number: 4,891,189
[45] Date of Patent: Jan. 2, 1990

[54] HIGH FLOW CHEMICAL OXYGEN GENERATOR ASSEMBLY

[75] Inventor: Van N. Harwood, Jr., Williamsville, N.Y.

[73] Assignee: Figgie International, Inc., Willoughby, Ohio

[21] Appl. No.: 215,712

[22] Filed: Jul. 6, 1988

[51] Int. Cl.⁴ .................................................. A62B 7/08
[52] U.S. Cl. ...................................... 422/165; 422/120; 422/126; 102/530; 128/202.26
[58] Field of Search ............... 422/120, 122, 125, 126, 422/165, 166; 44/3.6, 7.5, 7.6; 128/202.26; 102/530, 531

[56]  References Cited

U.S. PATENT DOCUMENTS

| | | | |
|---|---|---|---|
| 2,558,756 | 7/1951 | Jackson et al. | 422/120 |
| 3,482,568 | 12/1969 | Bovard | 422/120 X |
| 3,516,797 | 6/1970 | Bovard et al. | 422/120 |
| 3,536,070 | 10/1970 | Bovard | 128/202.26 |
| 3,573,001 | 3/1971 | Bovard | 422/120 |
| 3,737,287 | 6/1973 | Churchill et al. | 422/120 |
| 3,756,785 | 9/1973 | Netteland | 422/126 X |
| 3,868,225 | 2/1975 | Tidd | 422/122 |
| 3,906,945 | 9/1975 | Netteland et al. | 128/205.28 |
| 4,005,708 | 2/1977 | Netteland et al. | 128/205.28 |
| 4,039,620 | 8/1977 | Netteland et al. | 423/230 |
| 4,073,741 | 2/1978 | Heintz | 44/7.5 X |
| 4,427,635 | 1/1984 | Hahn | 422/120 X |
| 4,687,640 | 8/1987 | Schillaci | 422/120 |

Primary Examiner—Michael S. Marcus
Assistant Examiner—Rebekah A. Griffith

[57]  ABSTRACT

A high flow sodium chlorate oxygen generator assembly (10) of a relatively small diameter. The generator assembly includes a chlorate candle (12) mounted within a containment vessel (14, 16, 18), the chlorate candle being provided with a deep conical recess (54) which is thinly coated with a rapidly combustible material (56). Ignition of the rapidly combustible material is achieved by extending a hollow ceramic tube (58) from a primer (38) located at one end of the containment vessel, the hollow tube directing the flame from the primer, when ignited, towards the center of the deepest part of the conical depression. The above construction provides a high surface area for burning, and also intensifies the heat flux within the chlorate candle thereby substantially increasing the rate of oxygen output over known chlorate candles of comparable diameters.

3 Claims, 1 Drawing Sheet

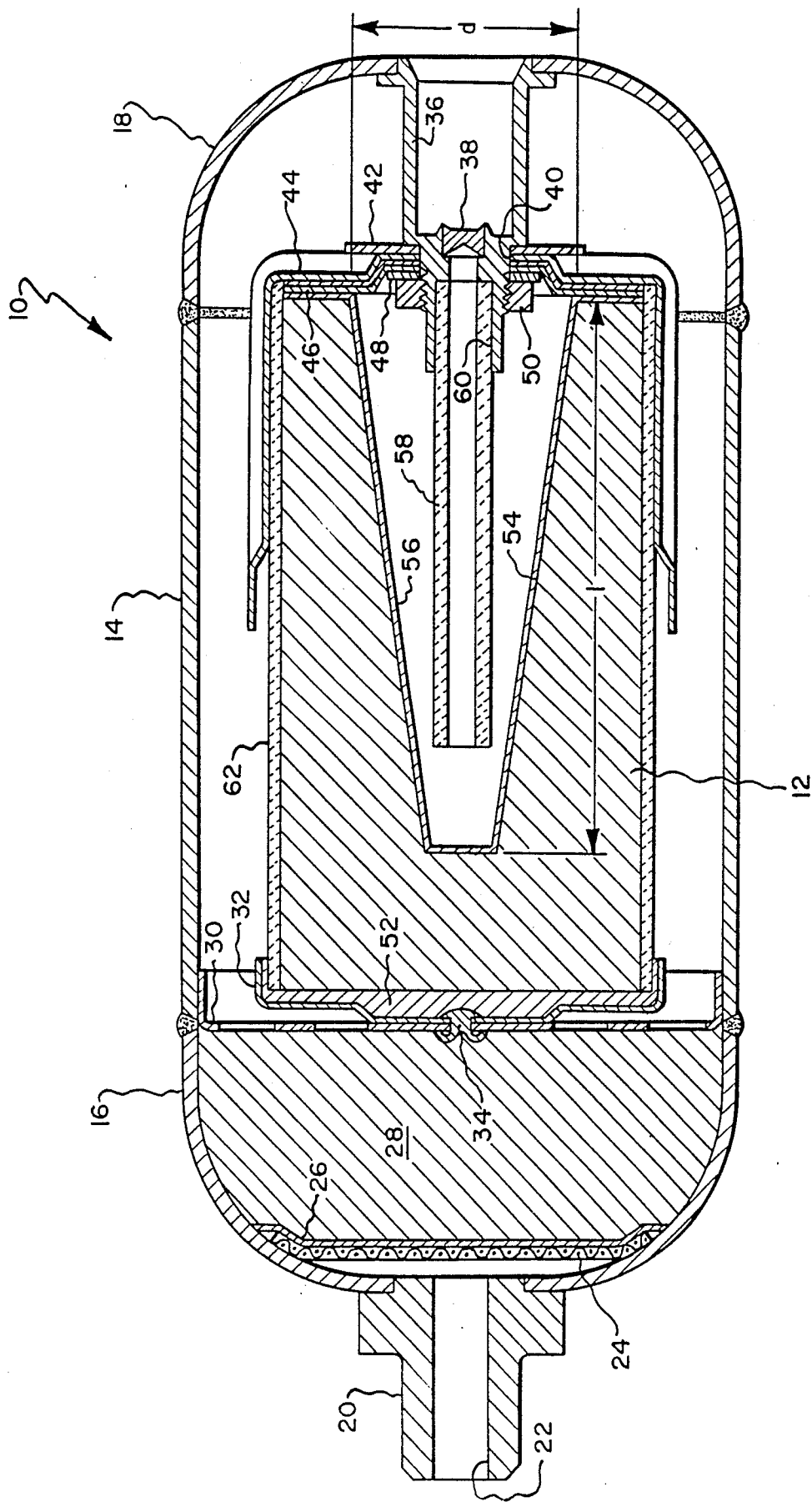

HIGH FLOW CHEMICAL OXYGEN GENERATOR ASSEMBLY

TECHNICAL FIELD

The present invention relates generally to oxygen generator assemblies of the type utilizing chlorate candles, and more particularly to a high flow oxygen generator assembly which includes a chlorate candle disposed in a containment vessel of relatively small diameter, the generator assembly being capable of producing a flow of oxygen substantially greater than those of the prior art having comparable diameters. The generator assembly of the present invention is useful for recharging oxygen gas storage systems.

BACKGROUND OF THE INVENTION

Oxygen generator assemblies utilizing chlorate candles are well known in the art and typical examples are U.S. patents 2,558,756, 3,536,070 and 4,687,640. These assemblies include a chlorate candle which is mounted in a containment vessel, both of which are typically cylindrical. The chlorate candles typically include sodium chlorate, or an equivalent chlorate or perchlorate which is capable of releasing oxygen when heated. The chlorate is typically mixed with an oxidizable element such as iron or carbon, a binder, and a peroxide for scrubbing chlorine from the gases released during combustion, the mixture of the various elements forming a pyrotechnic mix which is typically pressed into a cylindrical block. Oxygen is released during the heating of the sodium chlorate in accordance with the following reaction:

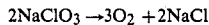

$$2NaClO_3 \rightarrow 3O_2 + 2NaCl$$

A typical mix may include 80% sodium chlorate, 10% iron powder, 4% Barium peroxide, and the balance being a binder such as glass fibers.

The various compositions of chlorate candles are well known in the art and the compositions may be varied to meet specific requirements.

It is well known from the prior art that the rate of oxygen output of a chlorate candle is a function of the inherent burn rate of the pyrotechnic mix, the burning area, and the surrounding temperature. In the prior art designs, the cylindrical chlorate candle is ignited at one end and, once ignited, the chlorate candle will continue to burn in a plane perpendicular to its axis. The cylindrical diameter conventionally determines the burning area available. A small generator assembly which is designed for high flow output would require either a large diameter compared to its length, or it would require a very fast burning pyrotechnic mix. There are practical limitations on how fast a candle can be made to burn. High heat flux and decreased efficiency are the consequences of adding a fuel to accelerate the burn. Practical considerations tend to limit the oxygen output to 20 liters per minute per square inch of burn area. Limitations to enlarging the diameter arise as the expanding diameter causes the configuration to approach a disk. In this case, the containment vessel of such a generator assembly configuration becomes unwieldly or incapable of containing pressure at a reasonable weight.

It is also known from the prior art that the pressed cylindrical block of sodium chlorate pyrotechnic material may be provided with a conical recess which in turn receives a conical plug of loose ignition material. In such prior art the burning is designed to progress in a substantially axially direction to achieve a relatively low oxygen flow.

OBJECTS AND SUMMARY OF THE INVENTION

It is a principal object of the present invention to provide a chlorate candle oxygen generator assembly which is designed to produce a higher flow of oxygen than known prior art chlorate candle oxygen generator assemblies of comparable diameters.

The foregoing is achieved by providing an enlarged burning area without expanding the diameter. This is achieved by constructing a pressed cylindrical block of a sodium chlorate pyrotechnic material with a deep conical depression in the ignition end. This conical recessed area is then coated with a rapidly combustible material to a thickness of not more than 2 millimeters. In order to ignite the rapidly combustible material, the containment vessel is provided with a primer in the form of a percussion or electric cap, the primer being located coaxially with the chlorate candle and at that end of the containment vessel which is adjacent the conical recess. The primer can be ignited by striking it with a firing pin or the like. In order to insure that ignition of the rapidly combustible material is at the proper location, a hollow ceramic tube extends from the primer towards the center of the deepest part of the conical depression to guide the flame from the primer (once fired) to the rapidly combustible material. Once the rapidly combustible material is ignited at one location the entire coating will become rapidly ignited (within a few seconds or less). As the ignition material burns it will ignite the surface of the chlorate candle within the conical depression which will then burn radially, rather than axially, as in the prior art. Thus, not only is a larger burning area provided by the conical depression within the cylindrical block, but the heat flux within the depressed area is intense and far less heat is lost to "cold" container interior surfaces while more is retained within the core. This effect further increases burning rate and flow output without fuel addition.

The foregoing design and other objects and advantages of this invention will become more apparent after consideration of the following detailed description taken in conjunction with the accompanying drawing in which a preferred form of this invention is illustrated.

BRIEF DESCRIPTION OF THE DRAWING

The FIGURE in the drawing is a cross section of a chemical oxygen generator assembly utilizing the principles of the present invention.

DETAILED DESCRIPTION

Referring now to the Figure, the high flow sodium chlorate oxygen generator assembly of this invention is indicated generally at 10 and includes a chlorate candle 12 mounted within the containment vessel. The containment vessel is of a relatively small diameter, for example 12 centimeters, and is formed of a cylindrical section 14 and two head assemblies 16, 18, the head assemblies being welded to the cylindrical section 14. Head assembly 16 is disposed at the exit end and is provided with a fitting 20 having a discharge port 22. Mounted within the exit head assembly 16 is a screen 24, a particulate filter pad 26, and additional filtering materials 28 which may be in the form of hopcalite. When the parts are assembled together in the manner shown in the drawing the filtering material 28 will be confined on the one side between the screen 24 and the particulate filter 26 and on the other side by an apertured plate 30 which is mounted within the cylindrical section 14. The plate 30 in turn carries a cup 32 which is coaxially mounted on the plate 30 by a rivet 34 or the like.

The ignition head assembly 18 is disposed adjacent the ignition end of the chlorate candle 12 and is provided with a tubular member 36 which carries a primer 38 in the form of a percussion cap. The ignition head assembly 18 additionally is provided with a firing pin and a mechanism for causing the firing pin to strike the primer when desired, the firing pin and associated mechanism not being shown in this drawing as it is well know in the art. The tubular member 36 is provided with a reduced diameter portion 40 upon which are mounted a washer 42, a cap 44, a ceramic fiber pad 46, a further washer 48, and a nut 50 which is utilized to maintain the cap 44 in pad 46 between the two washers in an assembled position.

The chlorate candle 12, which is of a cylindrical cross section, is mounted between the cup 32 and cap 44 with the ignition end of the candle 12 bearing against the pad 46, and the other end of the candle bearing against a pad 52 disposed between the candle and the cup 32.

In accordance with this invention, the chlorate candle 12 is provided with a deep conical recess 54, the length of the recess being preferably at least two times greater than the maximum diameter of the recess. Thus, the diameter "d" should be preferably not more than 50% the length "l". The recess is thinly coated with a rapidly combustible material 56 which is capable of igniting the candle once it is in turn ignited. The rapidly combustible material 56 is thinly coated over the entire area of the conical depression to a depth of approximately 2 millimeters or less. In order to properly ignite the rapidly combustible material at the center of the deepest part of the conical depression a hollow ceramic tube 58 is provided, which tube is mounted in a counterbored portion 60 of the tubular member 36.

In operation, when the primer 38 is struck by a firing pin the flash from the primer will extend through the hollow ceramic tube 58 causing the central portion of the ignition material to become ignited. Once the central portion of the rapidly combustible ignition material 56 is ignited it will quickly burn over the entire area of the coating 56, for example in two seconds. The material 56, when ignited, will also cause adjacent surface areas of the candle 12 to become ignited. Because of the large surface area provided by the deep conical depression or recess 54, and also because of the high heat flux which can be maintained within the conical depression 54, there will be a high outflow of oxygen from the candle, even though it is of a relatively small diameter. As the candle burns, relatively large quantities of oxygen (considering the diameter of the candle) will be evolved, the oxygen passing through the porous pad 46 and suitable apertures in the cap member 44, the oxygen then passing along the outside of the candle, which candle is wrapped with a ceramic fibre cloth 62, and then through suitable apertures in the cup 32, through the hopcalite filter material 28, particulate filter pad 26, screen 24, and then through the discharge port 22. While not shown, the containment vessel 14, 16, 18 may be provided with suitable pressure relief valves to prevent excessive pressure from being built-up within the vessel in the event the discharge through the port 22 is blocked.

By providing the design shown in the accompanying drawing and described above, it is possible to achieve the objectives of this invention of providing a relatively high rate of oxygen flow for a chlorate candle assembly of a relatively small diameter.

While a preferred structure in which the principles of the present invention have been incorporated is shown and described above, it is to be understood that this invention is not to be limited to the particular details shown and described above, but that, in fact, widely differing means may be employed in the practice of the broader aspects of this invention.

What is claimed is:

1. A high flow chemical oxygen generator assembly comprising:

a containment vessel (14, 16, 18);

a pressed cylindrical block (12) of pyrotechnic materials mounted within the containment vessel and which is capable upon ignition of generating oxygen, said cylindrical block being provided with a deep inwardly extending conical surface at its ignition end;

rapidly combustible material (56) thinly coated over the entire conical surface, said material being capable of igniting the pressed block of materials when burning; and, firing means (38, 58) carried by the containment vessel and capable, when operated, of initially igniting the rapidly combustible material at the center of the conical surface;

the assembly being so designed and constructed that, after initial ignition of the rapidly combustible material, burning of the rapidly combustible material will spread rapidly from the center of the conical surface over the entire area of the conical surface causing ignition of the conical surface of the cylindrical block which will then burn essentially radially whereby a larger burning area is provided by the conical surface, the heat flux within the burning area being intense to further increase the oxygen flow output of the assembly.

2. The high flow chemical oxygen generator assembly as set forth in claim 1 wherein the coating of the rapidly combustible material (56) is not more than 2 millimeters thick.

3. The high flow chemical oxygen generator assembly as set forth in claim 1 wherein the firing means includes a primer (38) located at the center of the end of the containment vessel adjacent the conical surface, and a hollow ceramic tube (58) which extends from the primer towards the center of the conical surface whereby reliable ignition at the center of the rapidly combustible material is achieved.

* * * * *